(12) United States Patent  (10) Patent No.: US 7,587,987 B2
Takato  (45) Date of Patent: Sep. 15, 2009

(54) ANALOG IMAGE INFORMATION DISPLAY

(75) Inventor: Kenichi Takato, Rochester Hills, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 0 days.

(21) Appl. No.: 12/043,322

(22) Filed: Mar. 6, 2008

(65) Prior Publication Data

US 2008/0149019 A1    Jun. 26, 2008

Related U.S. Application Data

(62) Division of application No. 11/585,551, filed on Oct. 24, 2006, now Pat. No. 7,520,243.

(60) Provisional application No. 60/729,785, filed on Oct. 24, 2005.

(51) Int. Cl.
 *G01D 7/04* (2006.01)
 *G01D 7/02* (2006.01)
(52) U.S. Cl. .................................. 116/300; 116/62.4
(58) Field of Classification Search ............... 116/62.1, 116/62.2, 62.3, 62.4, 286, 287, 288, 300, 116/301, DIG. 6, DIG. 36; 340/441, 459, 340/461, 462, 815.69, 815.78, 815.79, 815.8
See application file for complete search history.

(56) References Cited

U.S. PATENT DOCUMENTS

| | | | | |
|---|---|---|---|---|
| 1,999,073 A | * | 4/1935 | Awrey | 116/301 |
| 2,009,209 A | * | 7/1935 | Scantlebury | 362/26 |
| 4,194,587 A | * | 3/1980 | Shino et al. | 180/90 |
| 5,099,396 A | | 3/1992 | Barz et al. | |
| 5,920,256 A | * | 7/1999 | Toffolo et al. | 340/461 |
| 6,407,663 B1 | * | 6/2002 | Huggett | 340/461 |
| 6,561,123 B2 | * | 5/2003 | Kallinke et al. | 116/288 |
| 7,066,630 B1 | * | 6/2006 | Venkatram | 362/489 |
| 7,520,243 B2 | * | 4/2009 | Takato | 116/300 |
| 2005/0103254 A1 | * | 5/2005 | Birman et al. | 116/288 |

FOREIGN PATENT DOCUMENTS

| | | | |
|---|---|---|---|
| EP | 0900686 A2 | * | 3/1999 |
| EP | 1445776 | | 8/2004 |
| FR | 2729345 | | 7/1996 |
| JP | 876080 | | 3/1996 |
| JP | 8105759 | | 4/1996 |
| JP | 2003075207 A | * | 3/2003 |
| JP | 2004361182 | | 12/2004 |
| JP | 2007212409 | | 8/2007 |
| JP | 2007309837 A | * | 11/2007 |
| JP | 2009-58276 A | * | 3/2009 |
| WO | 03/057523 | | 7/2003 |

OTHER PUBLICATIONS

International Search Report and Written Opinion dated May 23, 2007.
Partial International Search Report—Invitation to Pay Additional Fees dated Mar. 6, 2007.

* cited by examiner

*Primary Examiner*—R. Alexander Smith

(57) ABSTRACT

An example display assembly includes a first and second dial face with a first pointer and a second pointer. An information display is disposed between the second scale and the second axis that generates data to communicate information about the vehicle. The second pointer includes a transparent portion to provide uninterrupted viewing of an information display within the second dial face.

15 Claims, 8 Drawing Sheets

ANALOG IMAGE INFORMATION DISPLAY

CROSS REFERENCE TO RELATED APPLICATION

This application is a divisional of U.S. application Ser. No. 11/585,551 filed on Oct. 24, 2006 and claims priority to U.S. Provisional Application No. 60/729,785 which was filed on Oct. 24, 2005.

BACKGROUND OF THE INVENTION

This invention generally relates to an indicator for an instrument panel. More particularly, this invention relates to an analog pointer that points to a digital display and provides for viewing through a pointer.

A vehicle instrument panel includes a dial face including numbers or other indicators utilized for indicating a vehicle operating parameter such as speed, and engine rpm. A movable pointer rotates relative to the dial face to provide the desired indication of the measured operating parameter. In some applications, additional information is displayed on the dial face by way of a digital display. The information displayed on the digital display is programmable and selectable to enable the display of many different items of desired information. The many different items of information that can be displayed on such a digital display are desirable so that more information can be displayed without requiring additional instrument displays.

Disadvantageously, a digital display is limited in the resolution that can practically be displayed. The use of a digital display even in a graphical format is limited by the limitations on resolution provided by an individual LED device. Additionally, a pointer for the gauge can partially cover some of the digital display during operation.

Accordingly, it is desirable to develop a vehicle information display that provides desired resolution for several different vehicle performance criteria and that provides an unimpeded view of the digital display no matter what the position of a pointer.

SUMMARY OF THE INVENTION

An example display assembly includes a first and second dial face with a first pointer and a second pointer. The second pointer is transparent to provide for continued viewing of an information display within the second dial face.

The example information display assembly includes a first dial face with a scale providing a scale indicative of a vehicle performance measurement. A first pointer rotates about a first axis to indicate a current measurement on the scale. The second dial face includes a digitally generated second scale. The second scale is selectable to display several different measurement scales. A second pointer rotates about a second axis to indicate a current value on the current second scale displayed.

An information display is disposed between the second scale and the second axis and generates data to communicate information about the vehicle. The second scale is digitally generated and the second pointer sweeps along to at a desired resolution to indicate a current vehicle operating parameter. The information display is disposed between the second axis and an outer perimeter of the pointer. Movement of the pointer however does not interfere with viewing of the information display disposed behind the pointer.

The second pointer includes a disk that rotates about the second axis. The disk is fabricated from a transparent material to provide for viewing of the information display there through. The disk includes an outer perimeter. It is on this outer perimeter that a pointer portion is supported. The pointer portion is not transparent but is instead visible to point to a specific portion of the second scale that corresponds with the current vehicle operating parameter.

Accordingly, the disclosed example information display provides desired resolution for several different vehicle performance criteria and provides an unimpeded view of the digital display no matter what the position of the second pointer.

These and other features of the present invention can be best understood from the following specification and drawings, the following of which is a brief description.

DETAILED DESCRIPTION OF THE PREFERRED EMBODIMENT

Figure 1:
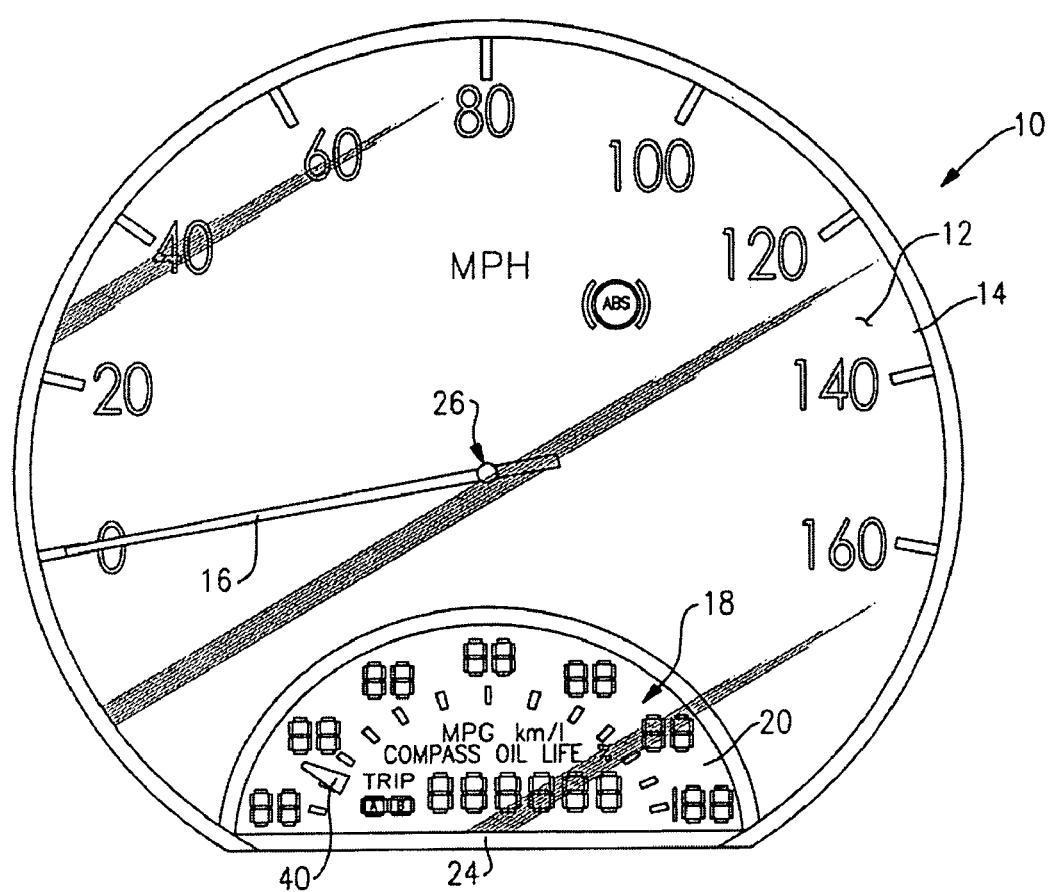
FIG. 1 is a plane view of an example dial assembly.

Referring to FIG. 1, an information display assembly 10 includes a first dial face 12 with a scale 14 providing a scale indicative of a vehicle performance measurement. A first pointer 16 rotates about a first axis 26 to indicate a current measurement on the scale 14. The display assembly 10 includes a second dial face 18 including a second scale 20. The second scale 20 is selectable between several different measurement scales. The second scale 20 is a digital image generated by a dot matrix LCD display. The example digital image generated by the dot matrix LCD provides for the creation of several different desired measurement scales. A second pointer 22 rotates about a second axis 28 (Best shown in FIG. 2) to indicate a current value on the current second scale 20 displayed.

An information display 24 is disposed between the second scale 20 and the second axis 28. The example information display 24 is a digital display that generates data to communicate information about the vehicle. The example digital display 24 is displaying the number of current trip miles. Other displays as are desired that communicate other data to a driver either through an alphanumeric display or graphical display can also be generated on the example information display 24.

Although the second scale 20 is digitally generated, the second pointer 22 is moved in a sweeping fashion to provide a desired resolution in the indication of vehicle operating parameters. The information display 24 is disposed between the second axis 28 and an outer perimeter 38 of the pointer 22. Movement of the pointer 22 however does not interfere with viewing of the information display disposed behind the pointer 22. This is so because the example pointer 22 includes a disk 32 comprised of a transparent material through which the information display 24 can be viewed.

Figure 2:
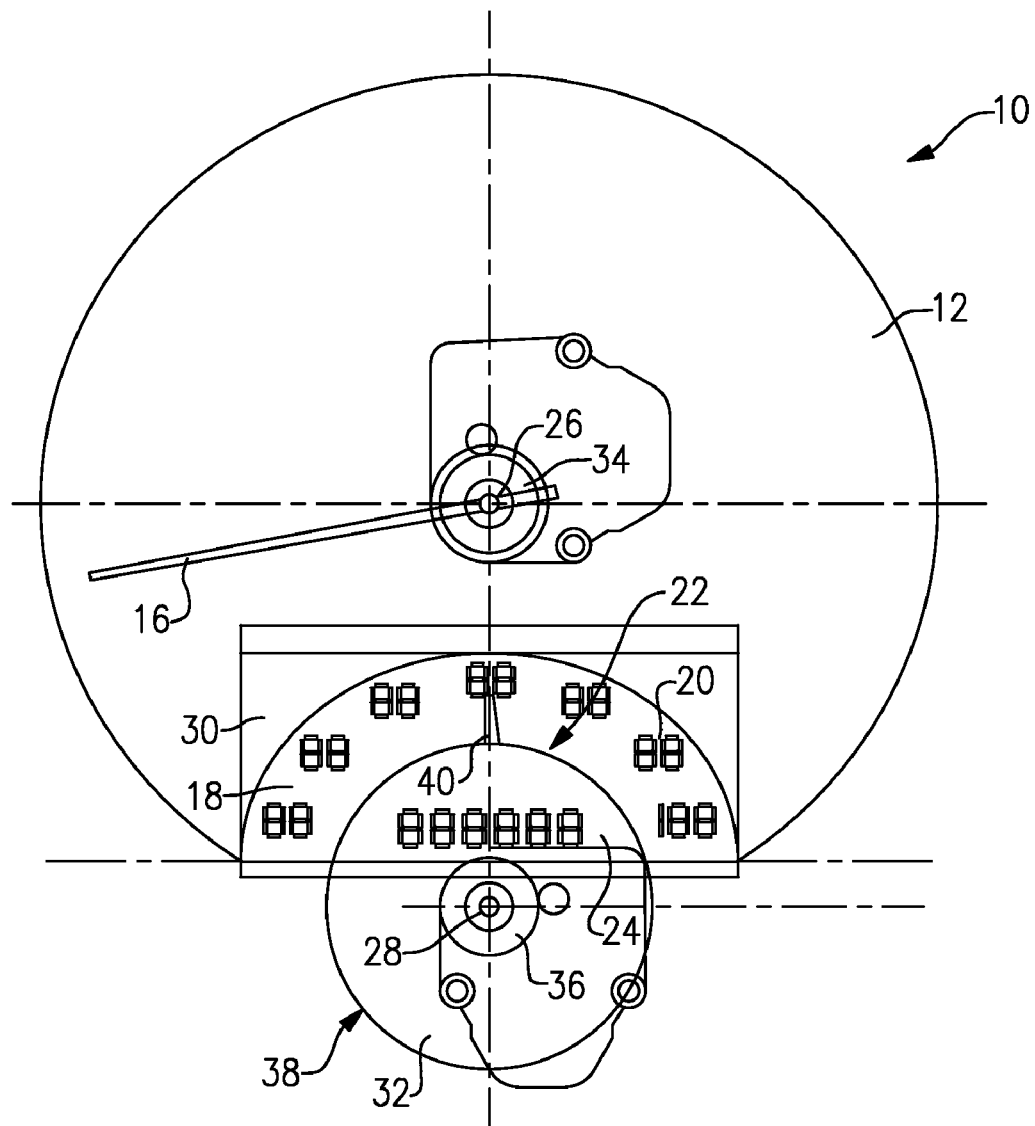
FIG. 2 is a sectional view of the example dial assembly.

Referring to FIG. 2, the second pointer 22 includes the disk 32 that rotates about the second axis 28. The disk 32 is fabricated from a transparent material to provide for viewing of the information display there through. The disk 32 includes an outer perimeter 38. It is on this outer perimeter 38 that a pointer portion 40 is supported. The pointer portion 40 is not transparent but is instead visible to point to a specific portion of the second scale 20 that corresponds with the current vehicle operating parameter.

The first pointer 26 is moved about the first axis 26 by a first motor 34. The second pointer 22 is moved about the second axis 28 by a second motor 36. The movement of the second motor 36 is controlled in a manner that coincides with the second scale 20 currently being generated on the second dial face 18.

The second scale 20 and the information display 24 are generated by a LCD panel 30. The example LCD panel 30 is a dot matrix LCD that provides for the generation of graphical images in addition to the numerical characters that make up the second scale 20. The second scale 20 is generated in a radial arc disposed about the second axis 28. The information display 24 is generated within the radial space between the second scale 20 and the second axis 28. The example information display 24 is substantially rectangular for displaying alphanumeric characters such as trip miles, or messages as is desired.

Figure 3:
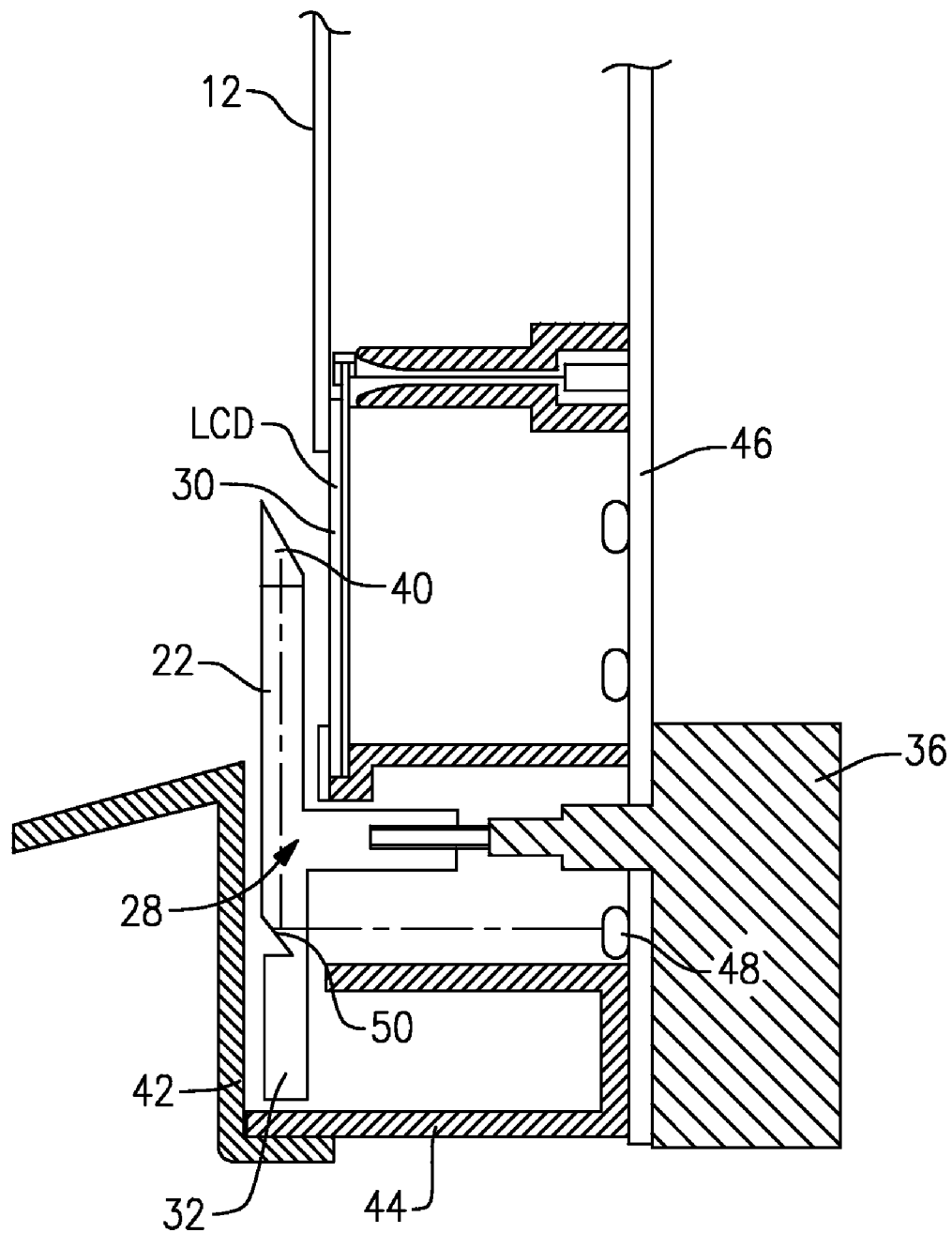
FIG. 3 is a cross-sectional view of the example dial assembly.

Referring to FIG. 3, the second pointer 22 includes a reflective surface 50 that directs light from a light source 48 through to the pointer portion 40. The transparent disk portion 32 does not reflect or accumulate light that interference with viewing the information display 24. Instead, light is transmitted to the pointer portion 40 to provide a visually highlight on the second scale 20.

A light housing 44 is provided to isolate light from being visible in undesired locations. A mask 42 shields light from becoming visible to an operator. The light housing 44 supports a light source 48 Supported on a circuit board 46 and the mask 42.

Figure 4:
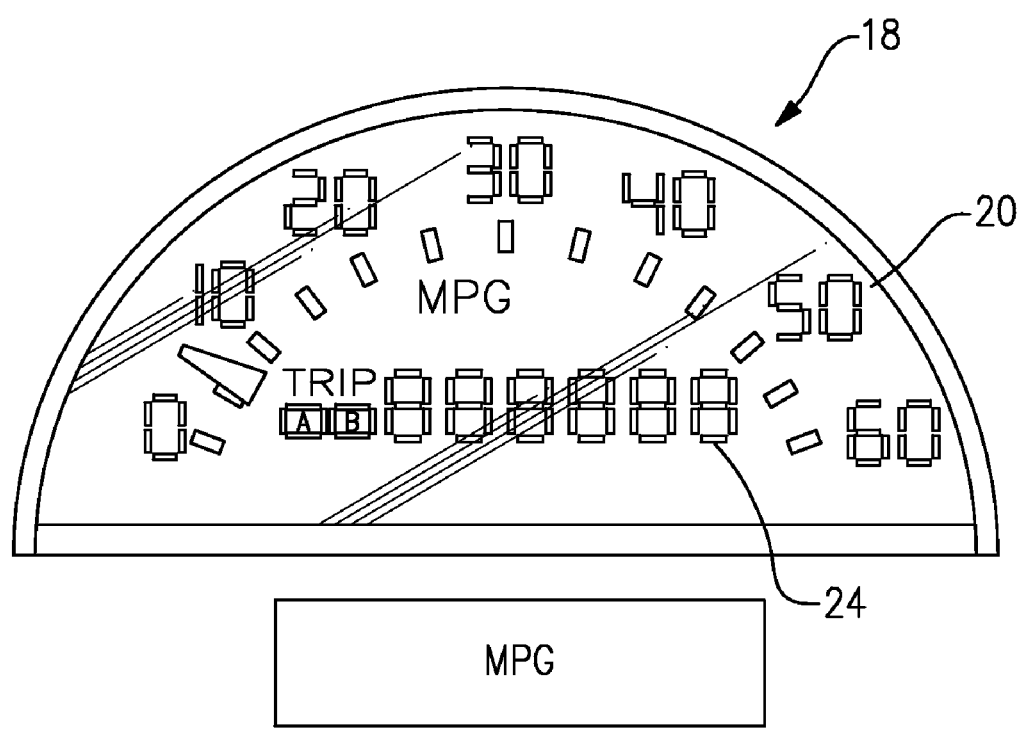
FIG. 4 is a plane view of an example analog information display.

Referring to FIG. 4, the example second face 18 is shown and includes the second scale 20 that provides a scale for miles per gallon that is indicated by the second pointer 22. The information display 24 in this example is providing an indication of the trip miles on the vehicle.

Figure 5:
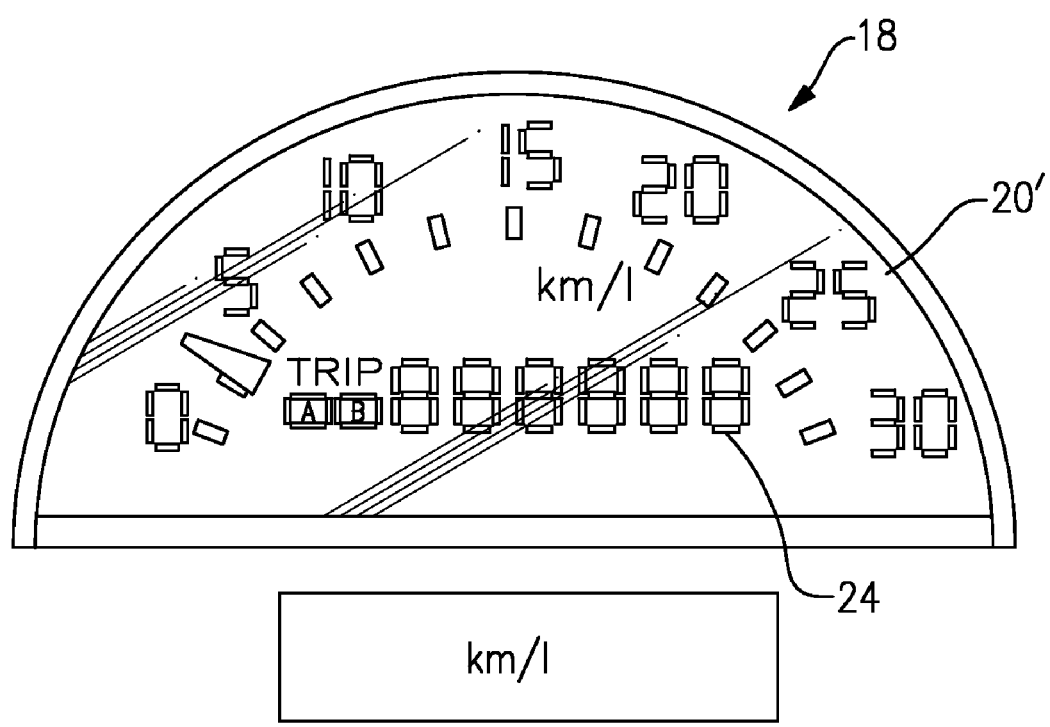
FIG. 5 is a plane view of an example analog information display.

Referring to FIG. 5, another example second face 18 is shown and includes a second scale 20' that provides a scale for kilometers per liter. The information display 24 remains the same to provide a value of trip miles.

Figure 6A:
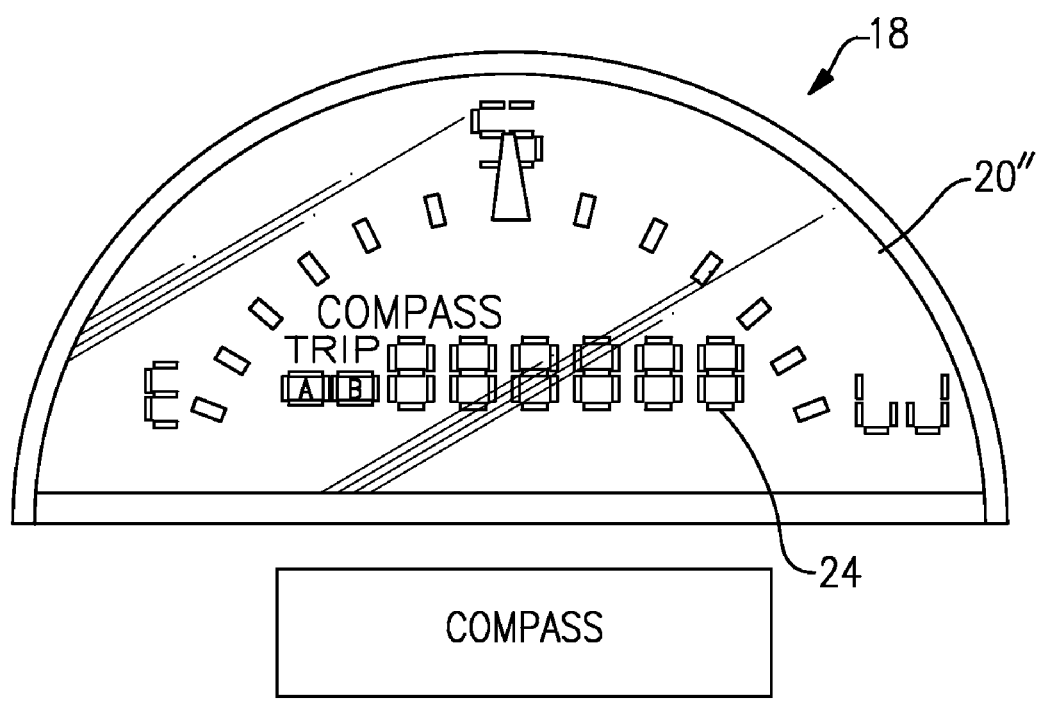
FIG. 6A is a plane view of an example analog information display.
Figure 6B:
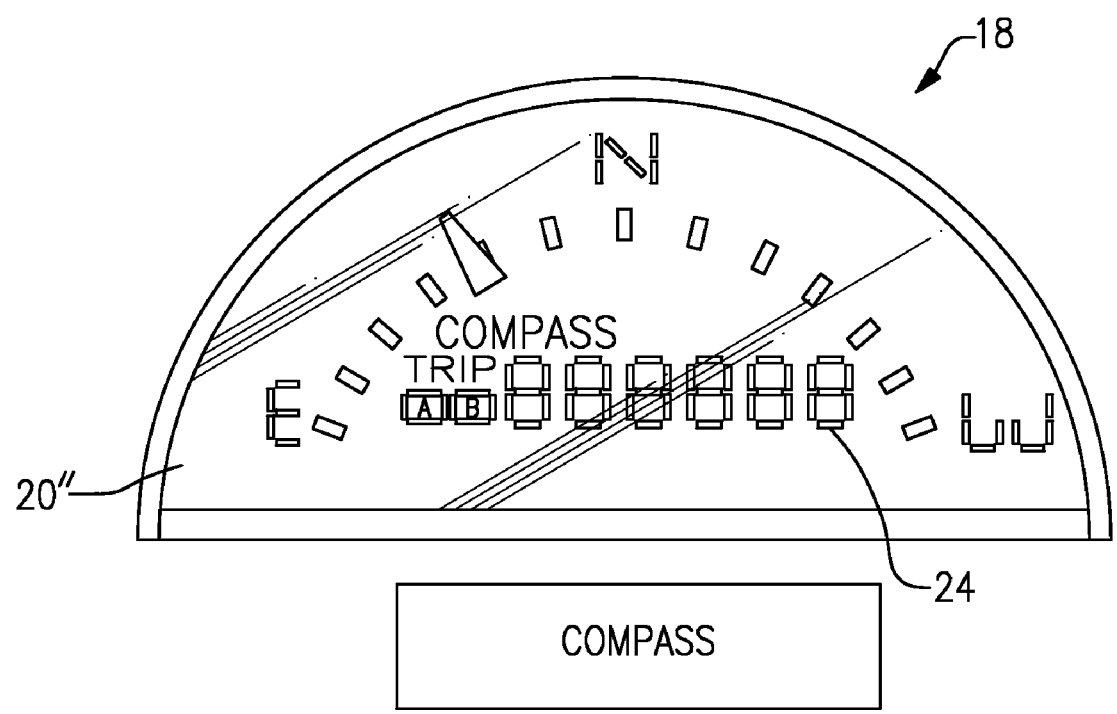
FIG. 6B is a plane view of an example analog information display.

Referring to FIGS. 6A and 6B, the example second dial 18 is shown that includes a second scale 20" that provides a compass view. The second pointer 22 rotates relative to the second scale 20" to point in the direction desired to indicate a direction that the vehicle is traveling, or any other directional indication desired. Because the second scale 20" providing the compass heading is digitally generated, it can rotate with directional changes of the vehicle (See FIG. 6B). The second scale 20" therefore simulates rotation of an analog compass.

Figure 7:
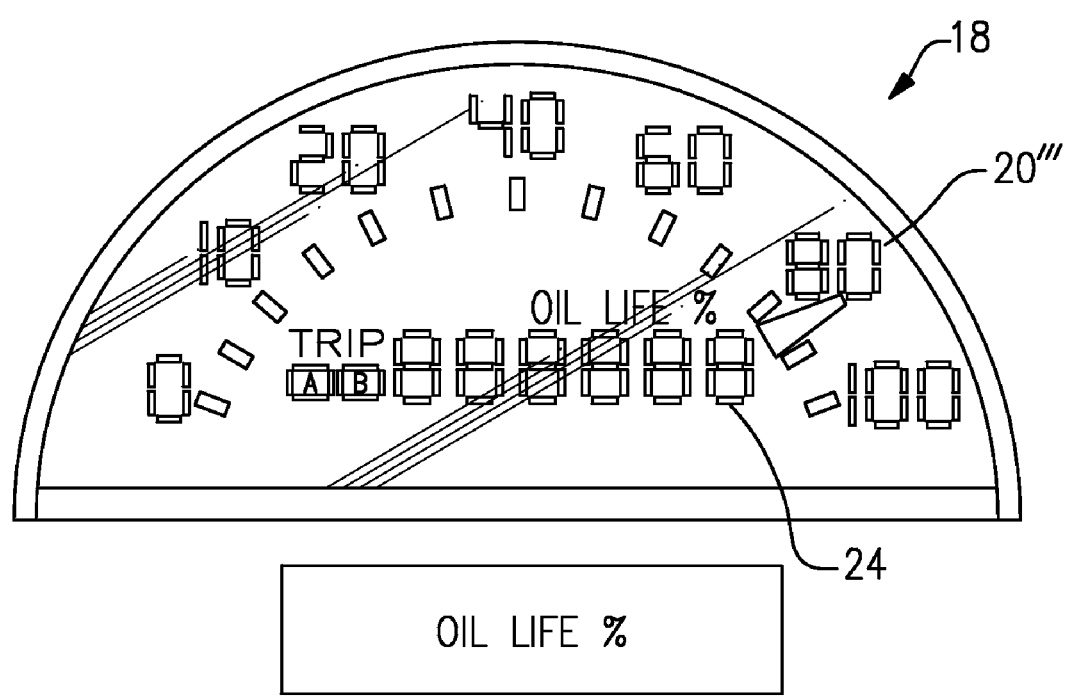
FIG. 7 is a plane view of an example analog information display.

Referring to FIG. 7, another example second dial 18 includes a second scale 20''' generated to provide measurements of the remaining oil life. The information display 24 provides a value indicative of trip miles. The information display 24 remains visible through the transparent disc 32 of the pointer 22.

The example information display 10 includes a second dial face 18 with a selectively digitally generated scale that is combined with movement of the pointer 22. The pointer includes the transparent disk 32 to permit viewing of the information display 24 no matter what the pointer position.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An instrument display device comprising:
   a gauge face,
   a first pointer movable about a first axis relative to the gauge face;
   a changeable display device disposed within the gauge face; and
   a second pointer that is movable about a second axis spaced apart from the first axis to point to a first portion of the changeable display device, wherein the second pointer includes a disk with an outer perimeter spaced radially from the second axis, and the changeable display device includes a second portion that displays information different than that displayed in the first portion in the space between the second axis and the outer perimeter of the second pointer.

2. The display device as recited in claim 1, wherein the first portion of the changeable display device displays a scale indicative of an operating condition, and said second pointer moves relative to the scale to indicate a current operating condition.

3. The display device as recited in claim 1, wherein the disk comprises a transparent portion disposed between the axis and the outer perimeter.

4. The display device as recited in claim 3, wherein a pointer portion extends from the transparent portion at the outer perimeter.

5. The display device as recited in claim 3, wherein the transparent portion covers the at least part of the second portion of the changeable display device.

6. The display device as recited in claim 3, wherein the transparent portion is circularly shaped.

7. The display device as recited in claim 3, wherein the first portion of the changeable display device displays a scale radially disposed about said transparent portion.

8. The display device as recited in claim 3, wherein the changeable display device comprises an LCD display.

9. The display device as recited in claim 3, wherein the second portion of the changeable display device includes information at least partially displayed behind said transparent portion.

10. An instrument dial assembly comprising:
    a first gauge representing a first measured value;
    a first pointer rotatable relative to the first gauge about an axis;
    a second gauge representing a second measured value disposed within the first gauge;
    a second pointer rotatable relative to the second gauge about a second axis; and
    an information display disposed within a radial space between the second axis and an end of the second pointer, wherein the information display is capable of displaying information different than the first measured value and the second measured value, wherein the second pointer includes a transparent surface portion through which the information display is visible.

11. The assembly as recited in claim 10, wherein the second pointer comprises a disk pointer including a pointer disposed on an outer perimeter of the transparent portion.

12. The assembly as recited in claim 11, wherein the second pointer rotates about the second axis and the information display is disposed within the radial space between the second axis and an outer perimeter of the second pointer.

13. The assembly as recited in claim 10, wherein the second gauge is selectable between a plurality of desired measurement scales and the second pointer indicates a value on the desired measurement scale.

14. The assembly as recited in claim 10, wherein said second gauge comprises an LCD display that is changeable to define a desired scale onto which the second pointer indicates a current value.

15. The assembly as recited in claim 14, wherein the information display comprises a digital LCD display.

\* \* \* \* \*